Figure 1:
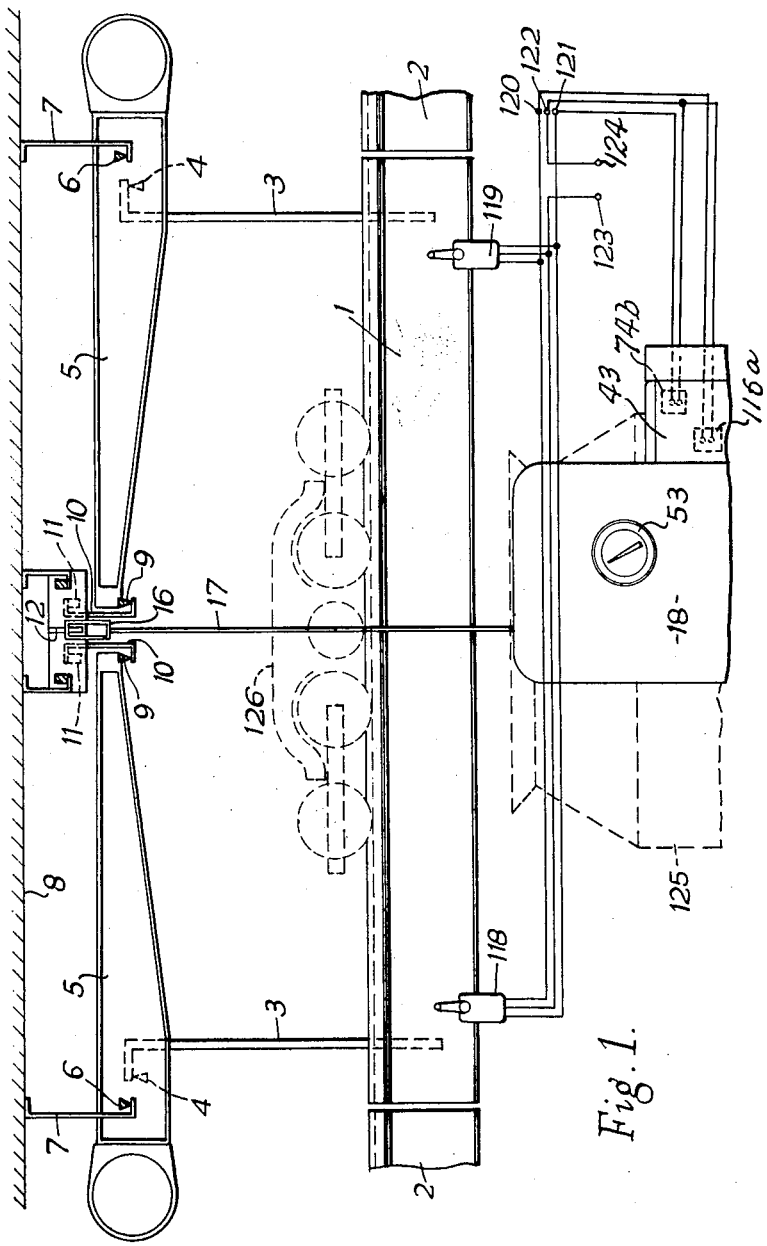

Nov. 27, 1962  S. C. BROWN  3,065,809
INTERMITTENT WEIGHING AND WEIGHT INDICATING APPARATUS
Filed July 21, 1958  8 Sheets-Sheet 2

Nov. 27, 1962   S. C. BROWN   3,065,809
INTERMITTENT WEIGHING AND WEIGHT INDICATING APPARATUS
Filed July 21, 1958   8 Sheets-Sheet 3

INVENTOR
Sidney C. Brown
BY
Ralph B. Stewart
ATTORNEY

Nov. 27, 1962  S. C. BROWN  3,065,809
INTERMITTENT WEIGHING AND WEIGHT INDICATING APPARATUS
Filed July 21, 1958  8 Sheets-Sheet 5

INVENTOR
Sidney C. Brown
BY
Ralph B. Stewart
ATTORNEY

Nov. 27, 1962 S. C. BROWN 3,065,809
INTERMITTENT WEIGHING AND WEIGHT INDICATING APPARATUS
Filed July 21, 1958 8 Sheets-Sheet 6
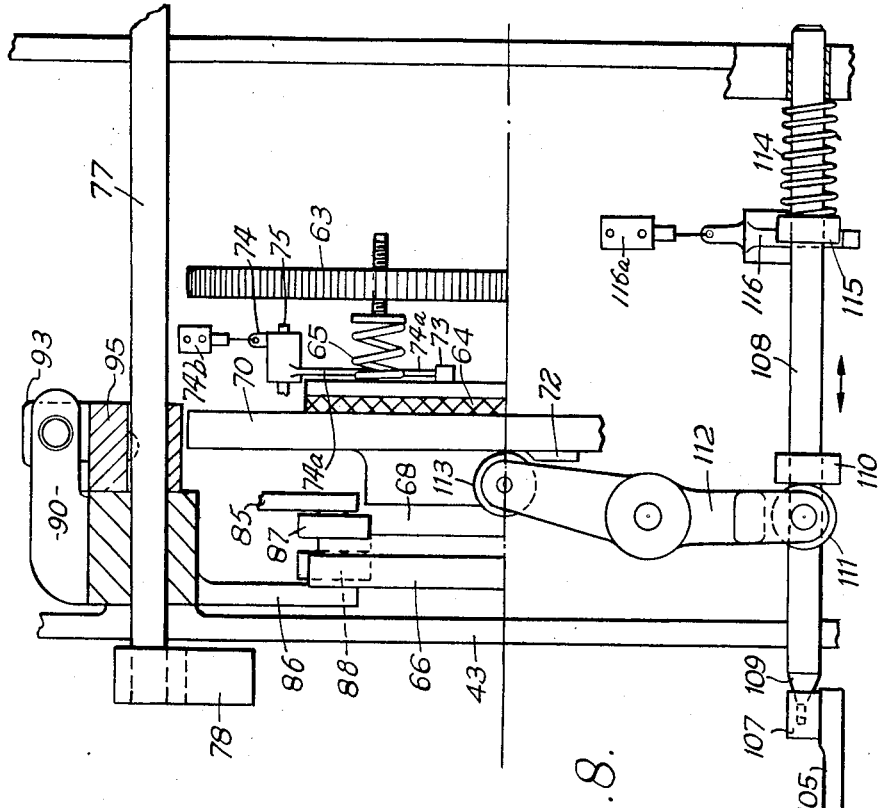
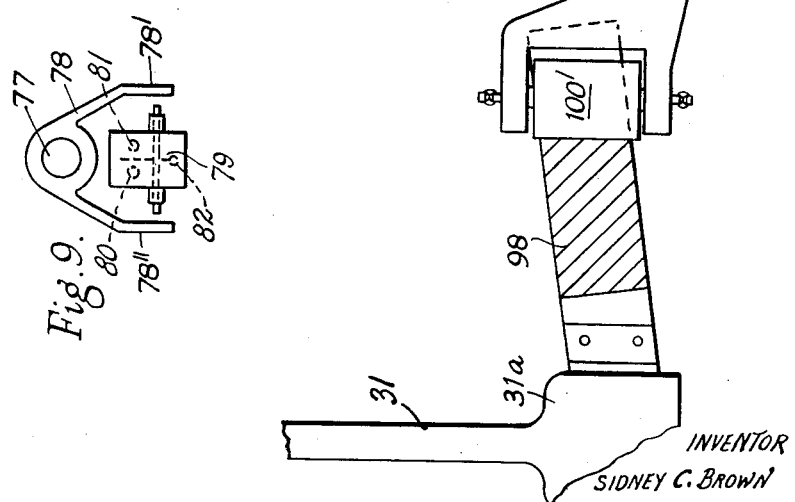
INVENTOR
SIDNEY C. BROWN
BY Ralph B. Stewart
ATTORNEY Nov. 27, 1962 S. C. BROWN 3,065,809
INTERMITTENT WEIGHING AND WEIGHT INDICATING APPARATUS
Filed July 21, 1958 8 Sheets-Sheet 7

INVENTOR
Sidney C. Brown
BY
Ralph B. Stewart
ATTORNEY

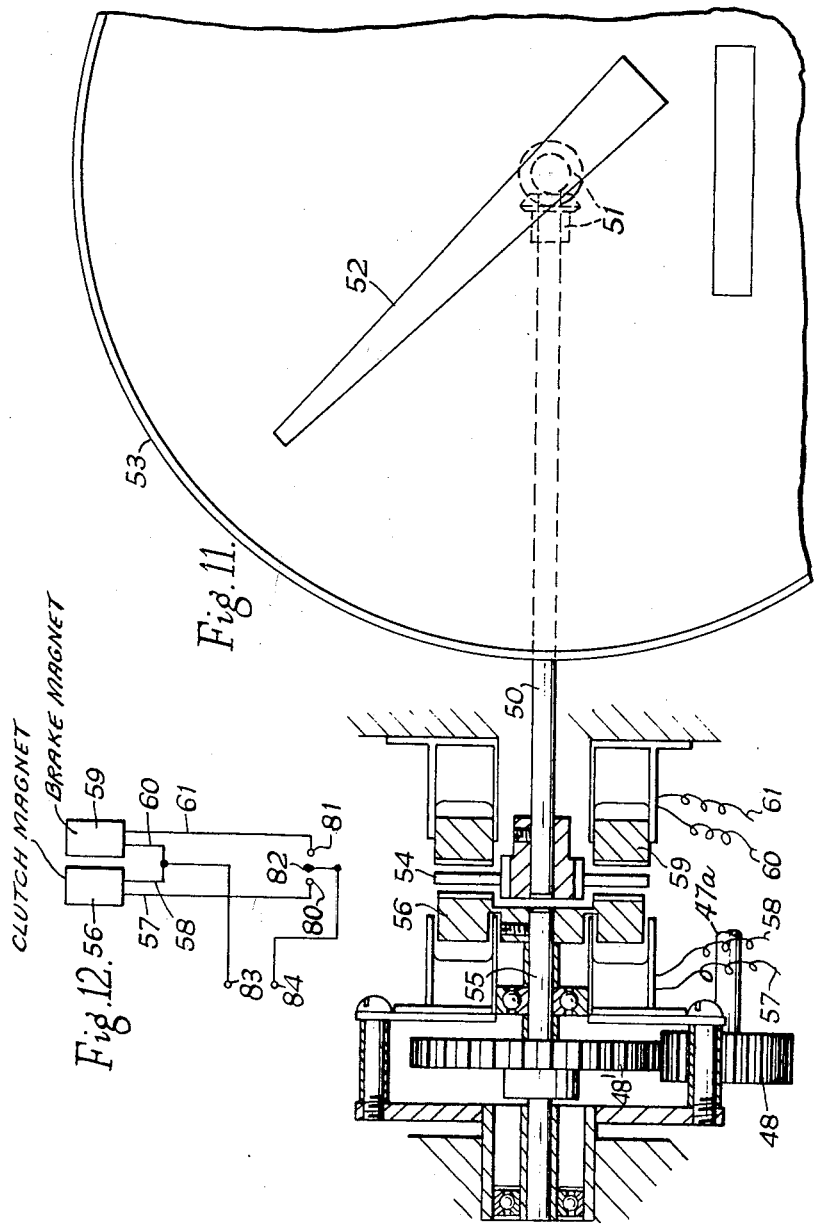

United States Patent Office 3,065,809
Patented Nov. 27, 1962

3,065,809
INTERMITTENT WEIGHING AND WEIGHT INDICATING APPARATUS
Sidney Charles Brown, Sutton, England, assignor to Adequate Weighers Limited, Sutton, Surrey, England
Filed July 21, 1958, Ser. No. 749,879
Claims priority, application Great Britain July 23, 1957
8 Claims. (Cl. 177—156)

The present invention relates to an apparatus for weighing and indicating an intermittent succession of loads applied to the apparatus and as an example may be mentioned the weighing and indicating of the weight of a succession of travelling loaded skips as they are moved on an overhead rope or rail conveyor.

The weighing and indicating apparatus according to the invention comprises a frame structure, a weigher system including a pendulum movable on the frame structure to an extent related or determined by the weight of a load applied to the weigher system, means for locking the pendulum on the frame structure in a position attained in response to the application of a load to the weigher system, an indicator, driving means for said indicator including a constant-speed driving shaft and a driven shaft driven from the said driving shaft through an infinitely variable change speed gear controlled by the pendulum and a clutch between said driven shaft and the indicator, control means for effecting the operations of locking the pendulum and clutching and unclutching the driven shaft to and from the indicator in a predetermined fixed time succession and means actuated by movement of the load relative to the frame structure to actuate said control means. The arrangement is such that as each load to be weighed is applied to the weigher system of the apparatus the pendulum takes a position of equipoise corresponding to the load and the gear ratio between the constant speed driving shaft and the driven shaft is correspondingly set. Thereafter the pendulum is locked in that position of equipoise following which the driven shaft is clutched to the indicator and the latter is driven for a time interval determined by the control means (and which is the same for each of the succession of loads) before the indicator is unclutched from the driven shaft.

Thus an indication is given which is related to the weight of the load.

In some cases the unclutching of the indicator from the driven shaft is followed by release of the pendulum to return to a zero position in readiness for the next load.

In the at present preferred arrangement however the pendulum is maintained locked after drive of the indicator has ceased and is released as a first step after the next load is supplied to the apparatus, followed by re-locking before the indicator is brought into operation. Thus the pendulum is required to move angular distances corresponding only to differences between successive loads thus enabling faster weighing and greater compactness in the equipment.

Figure 2:
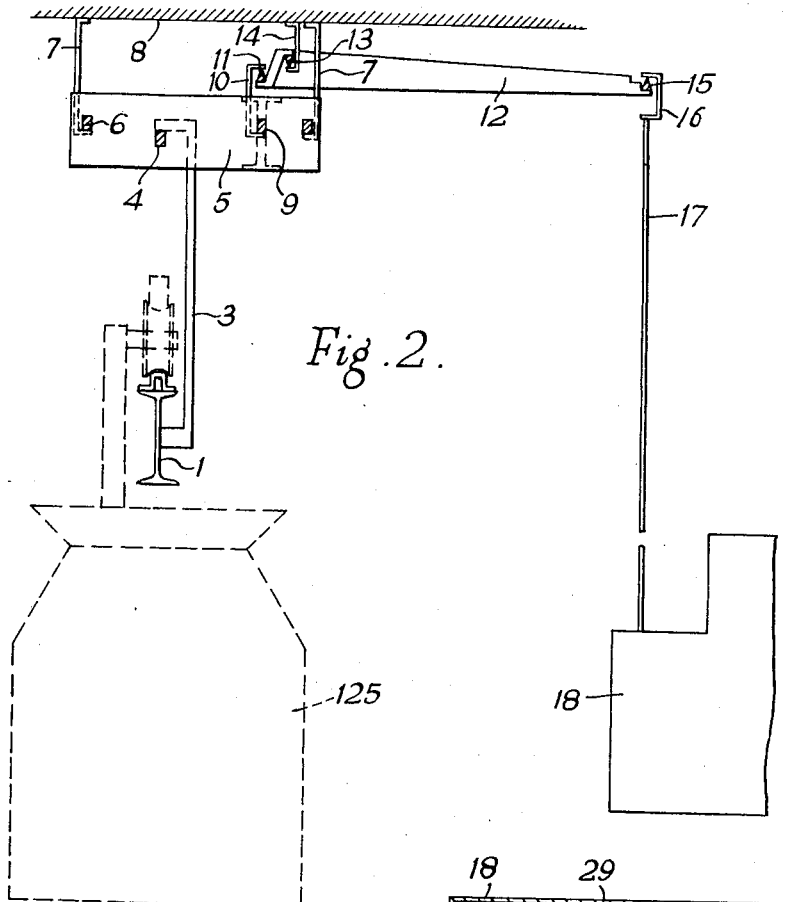
Figure 3:
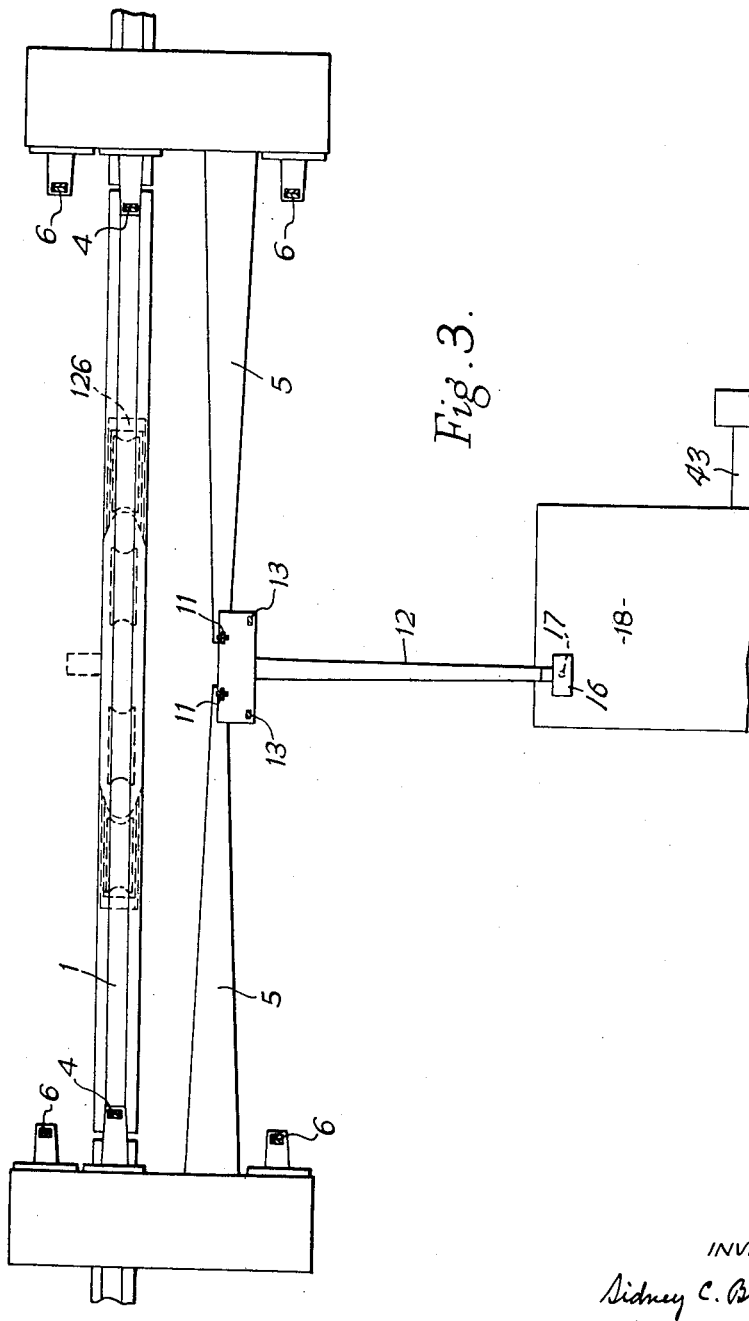
Figure 4:
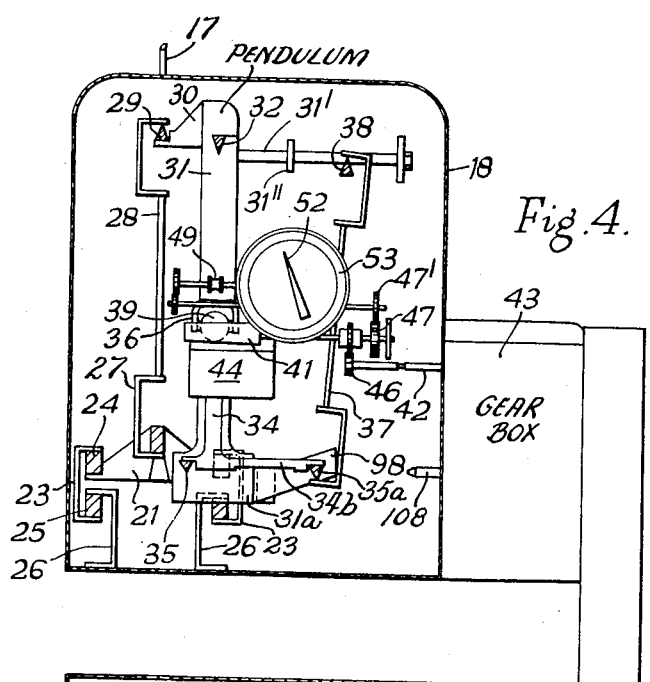
Figure 5:
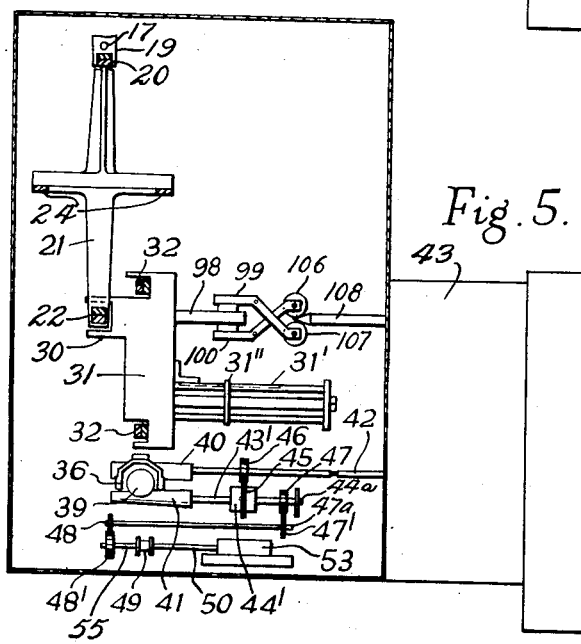
Figure 7:
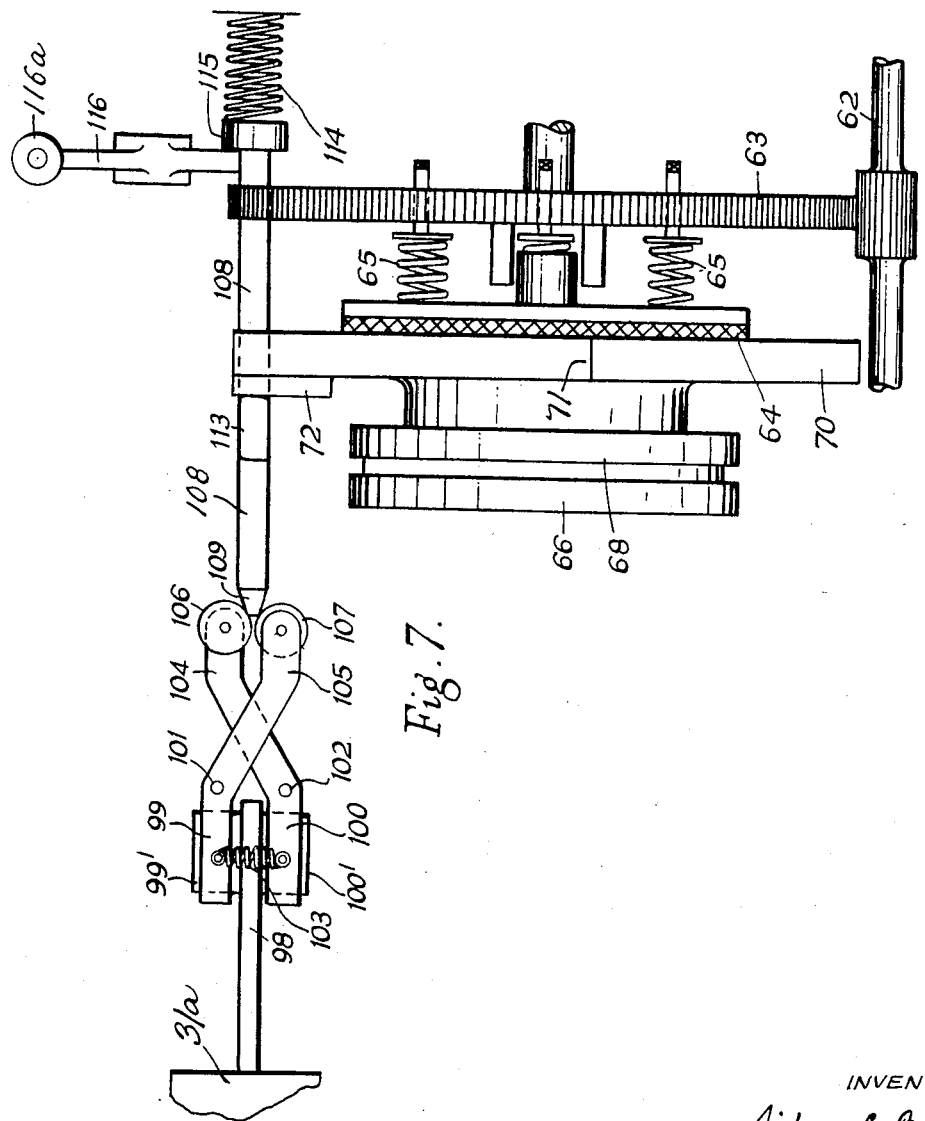
Figure 10:
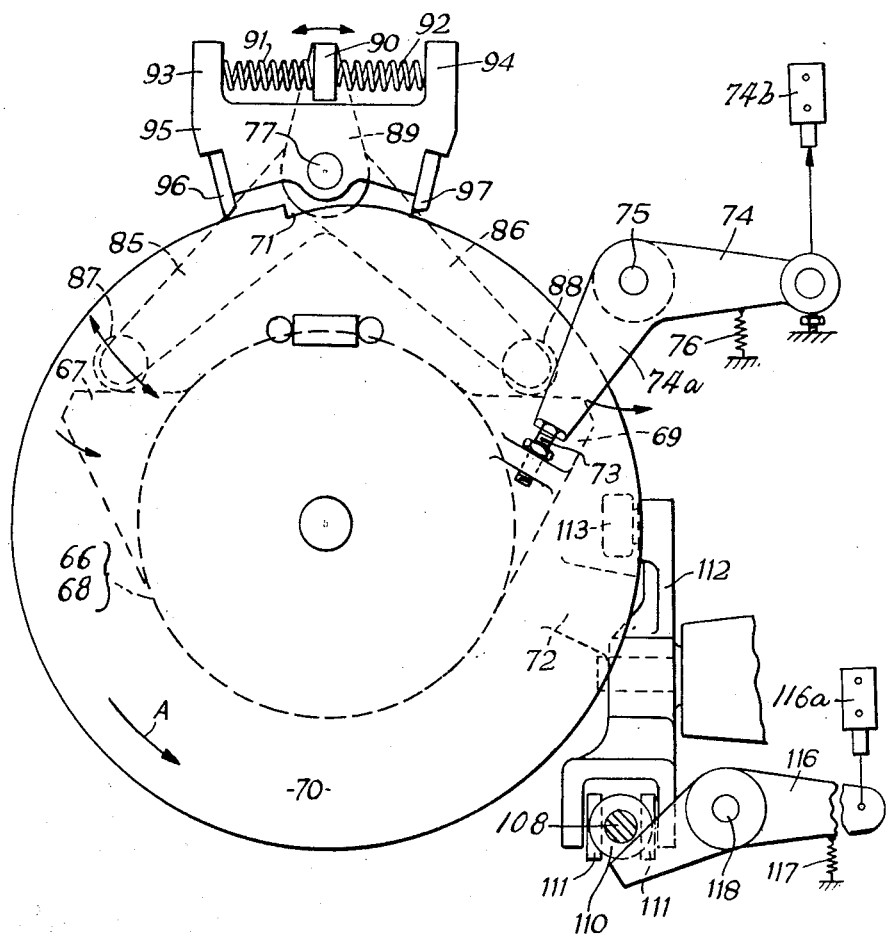

In order that the invention may be clearly understood and readily carried into effect an embodiment thereof will now be described by way of example with reference to the accompanying drawings, in which, FIG. 1 shows in side elevation view of the apparatus, FIG. 2 is an end elevation of the apparatus as seen from the left of FIG. 1, FIG. 3 is a plan view of the apparatus shown in FIG. 1, FIG. 4 is a view in elevation of part of the apparatus within indicator housing 18 as seen from the front of FIG. 1, FIG. 5 is a plan view of the apparatus of FIG. 4, FIG. 6 is an end view of the apparatus of FIGURES 4 and 5 as seen from the left of FIGURE 1, FIG. 7 is a plan view of another part of the indicating apparatus, including control cam and clutch mechanism contained within gearbox 43, FIG. 8 is a side view of the apparatus shown in FIG. 7, showing also further parts, FIG. 9 is a detail view of part of the apparatus shown in FIG. 8, FIG. 10 is a view in elevation of the control cam mechanism of FIGS. 6 to 9 as viewed from the right of FIGURE 8 with certain parts omitted, FIG. 11 is a side view, partly in section and on a larger scale, of a weight-indicating device and associated clutch and brake mechanism of FIGURE 5, and FIG. 12 is an electrical circuit diagram for the clutch mechanism of FIG. 11.

Referring to the drawings, the apparatus comprises a horizontal weigh rail 1 inserted as an independent section in a conveyor rail 2 along which a succession of skips to be weighed are moved. The weigh rail 1 is suspended by arms 3 which hang on knife edge pivots 4 mounted on horizontal levers 5, which in turn are suspended by knife-edge pivots 6 that are carried by the levers near their outer ends and rest on the lower angled ends of arms 7 the upper ends of which are fixed to a stationary frame 8. The inner ends of the levers 5 carry knife edge pivots 9 which rest on the lower ends of two C-links 10 the upper ends of which rest on two knife edge pivots 11 on one end of a transfer lever 12 which is pivoted on a horizontal axis by two knife-edge pivots 13—13 engaging the angle ends of two arms 14 fixed to the frame 8, the other end of the transfer lever 12 carrying a knife edge pivot 15 on which rests a bracket 16 fixed on the upper end of a pull rod 17. The lower end of the pull rod 17 projects into a housing 18 (FIGURE 6) and carries a bracket 19 which engages beneath a knife edge pivot 20 on one end of a lever 21, the other end of which carries a knife edge pivot 22. Lever 21 is pivotally mounted on a horizontal axis by two C-links 23 which engage, at their upper ends, knife edge pivots 24 located on opposite sides of the center of lever 21. The upper arms of links 23 engage two, knife edge pivots 25 carried by an arm 26 fixed to the bottom wall of housing 18. Pivots 24—24 establishes a horizontal pivotal axis for lever 21. The pivot 22 rests on a bracket 27 on the lower end of a pull rod 28 the upper end of which rests on a knife edge pivot 29 on an arm 30 on a pendulum comprising an arm 31 suspended at its upper end, on a horizontal pivotal axis provided by two knife edge pivots 32—32 engaging fixed supports (not shown). The arm 31 carries a horizontally extending frame 31' on which is an adjustable balance weight 31" for zero adjustment with the weigh rail 1 empty.

A vertical arm 34 having a horizontal extension 34a at its lower end is pivotally supported on the lower end portion 31a of the pendulum 31 by a pair of pivots 35—35 (see FIGURE 6) spaced along the arm extension 34a and forming a pivotal axis parallel with the pivotal axis 32—32 at the upper end of pendulum 31. The upper end of vertical arm 34 carries a fork 36 directed away from the pendulum. The arm 34 is also provided with a horizontal extension 34b at its lower end extending at right angles to the axis 35—35 and parallel with the frame 31'. A linkage comprising a link 37 is connected at its lower end to a pivot 35a at the end of arm extension 34b and connected at its upper end to a fixed pivot 38 which is spaced from the pivot 32 the same distance of the spacing between pivots 35 and 35a. This linkage connection insures that the fork 36 will move horizontally with swinging of the pendulum 31 about the pivot axis 32—32, and horizontal movement of fork 36 will correspond with the horizontal component of movement of the axis 35—35 at the lower end of the pendulum. The elements 34a, 34b, 35, 35a, 37 and 38 are not shown in FIGURE 5 in order to avoid crowding of the drawing. The elements 34b, 35a, 37 and 38 are not shown in FIGURE 6 for the same reason.

The fork 36 embraces a ball 39, made from hardened steel, which lies in the valley between two rollers 40 and 41. As shown in FIGURE 5, the roller 40, which is of circular cylindrical shape, is connected to a shaft 42 which is adapted to be driven at a constant speed by an electric motor (not shown) via a gearbox 43 of which the shaft 42 is the output shaft. The roller 41, which is of conical shape, is driven by the cylindrical roller 40 via the ball 39, which is pulled firmly against the rollers 40 and 41 by a magnet 44 mounted beneath the rollers. It will be appreciated that by movement of the ball 39 along the rollers 40 and 41 under the action of the fork 36 the speed ratio between the rollers is varied due to the conical shape of the roller 41, and since the speed of roller 40 is constant the speed of roller 41 is thereby varied. The shaft 43' on which roller 41 is mounted is connected to an input element of a spur gear differential mechanism 44', another input element 45 of which is driven by a gear wheel 46 on the shaft 42, and the output shaft 44a of the differential mechanism is connected by gear wheels 47, 47', shaft 47a, gears 48, 48', shaft 55 and clutch and brake mechanism 49 to a shaft 50, which drives via bevel gearing 51 (FIGURE 11) the pointer 52 of the indicating device 53. The brake and clutch mechanism 49 is shown diagrammatically in FIG. 5. As shown in more detail in FIG. 11, the shaft 50 carries an armature disc 54 which is rotatable with and is axially movable on the shaft 50. The shaft 55 carrying the gear wheel 48' has fixed on it an electromagnet 56 which is on one side of the armature disc 54 and under appropriate conditions is energised via leads 57, 58 through slip rings (not shown), thereby attracting disc 54 and effecting a driving coupling between shafts 55 and 50 to drive the pointer 52. On the other side of the armature disc 54 is a stationary electromagnet 59 which under appropriate conditions can be energised via leads 60 and 61, thus attracting or clamping disc 54 and holding pointer 52 stationary.

Energization of magnets 56 and 59 is controlled by a controller illustrated in FIGURES 7 to 10 and 12. A driven shaft 62 of the gearbox 43 drives a gear wheel 63, (FIGS. 7 and 8) which is drivably connected to a cam assembly through the medium of a slippable friction clutch 64 which is urged towards the engaged position by springs 65. The cam assembly comprises a part 68 having a rise 67 on its periphery FIGURE 10 and a part 66 having a rise 69, on its periphery and a disc 70 formed with a notch 71 in its periphery and a rise 72 on one face thereof, FIGURES 7, 8 and 10. The disc 70 carries an adjustable stop 73 on the opposite face from the rise 72, see FIGURE 10. A double-armed lever 74 pivotally mounted at 75 is normally urged by a spring 76 so as to project its arm 74a into the path of the stop 73 so as to prevent rotation of the cam assembly. It can be rocked, by means to be described, out of the path of the stop 73 so as to allow the cam assembly to be driven by the constant speed gear wheel 63 through the clutch 64, in the direction of arrow A, FIG. 10. Parts 73, 74, 74a, 74b and 75 have been omitted from FIGURE 7 to avoid confusion with other parts. Likewise, in FIGURE 8, portions of certain parts below the center line of cam disc 70 are not shown. Parts 63, 64, 65, 114 and 115 shown in FIGURE 8 are omitted from FIGURE 10 for better showing of other parts.

In the housing of the gearbox 43 is mounted a rockable shaft 77 on which is fixed a double lever 78 (FIGS. 8 and 9) the arms of which extend past or embrace the actuating members of a switch 79, which includes the fixed contacts 80 and 81 and the movable contact 82 (FIG. 12) for selectively energising the electromagnets 56 and 59. The electrical circuit shown in FIG. 11 is connected to the mains supply at 83 and 84.

The shaft 77 has freely mounted thereon a lever (FIG. 10) comprising arms 85 and 86 with rollers 87 and 88 at their ends, cooperating with cams 66 and 68 respectively. The said lever has a further arm 89 with an abutment 90, against the sides of which bear the ends of compression springs 91 and 92 the other ends of which bear against arms 93 and 94 on a member 95 which is fixed on the shaft 77. The member 95 carries knife edge fingers 96 and 97 which cooperate with the periphery of the cam disc 70.

The controller of FIGURES 7, 8 and 10 also controls a clamping device which at certain times clamps the pendulum in its deflected position.

The pendulum 31 carries a plate 98 (FIGS. 4, 7 and 8) which projects between blocks 99' and 100' pivotally mounted in arms 99 and 100 of a scissors lever assembly pivoted at 101 and 102 to a fixed support, not shown. A tension spring 103 interconnects the arms 99 and 100 and biases the arms toward clamping position. The arms 104 and 105 of the scissors lever assembly carry rollers 106 and 107. In the gearbox housing 43 is mounted an axially movable rod 108 with a tapered end 109 centrally disposed with respect to the rollers 106 and 107. The rod 108 has a collar 110 (FIG. 8) against which bear rollers 111 on one arm of a lever 112, the other arm carrying a roller 113 that cooperates with the rise 72 on the cam disc 70. A compression spring 114 bears against a collar 115 on the rod 108, thus tending to urge the rod 108 in the direction to cause the tapered end to enter between the rollers 106 and 107 and release the clamping of the pendulum. A lever 116 normally projects in front of the collar 115 under the action of a spring 117, but can be electrically actuated by electro-magnet 116a, as will be described, so as to rock about its pivot 118 out of the path of the collar 115 (see FIGURE 10). Parts 110, 111 and 112 are omitted in FIGURE 7 but are shown in FIGURE 8.

One the weigh rail 1 are mounted limit switches 118 and 119, which are provided with electrical leads connected at terminals 120 and 121 to first and second solenoids 116a and 74b of the controller, terminal 122 being a common terminal, and connected at terminals 123 and 124 to the main supply.

In FIG. 1 is shown a skip 125 suspended from a bogie 126 the wheels of which are on the weigh rail 1.

The operation of the indicating apparatus is as follows:

The skips are moved successively along the rail comprising the weigh rail 1 and the fixed rail sections 2; it will be assumed that the movement of the skips is from left to right in FIG. 1. Prior to a skip moving on to the weigh rail 1, which is therefore unloaded, the lever 74 is in the path of the stop 73, and the rod 108 is held retracted from the rollers 106 and 107 by the lever 116, so that the plate 98 carried by pendulum 31 is gripped between the blocks 99' and 100', holding the pendulum stationary. The motor driving the shaft 62 runs continuously so long as weighing operations are to be performed, and the gear wheel 63 is therefore rotating, but the clutch 64 is slipping due to the rotation of the cam assembly 66, 68 and 70 being arrested by the lever 74. The electromagnet 56 is de-energised and the electro-magnet 59 is energised, so that the shaft 50 is arrested due to the armature disc 54 being held stationary against the face of electromagnet 59.

When a skip has travelled completely on to the weigh rail 1 a suitable projection (not shown) on the skip actuates the limit switch 118, thereby momentarily energising via terminals 120 and 122 the said first solenoid 116a which causes the lever 116 to rock out of the path of the collar 115 on the rod 108, thereby enabling the spring 114 to move the rod 108 (to the left in FIG. 8) to cause its tapered end 109 to force the rollers 106 and 107 apart, thereby opening the levers 99 and 100 and so freeing the plate 98. The pendulum 31 is thereby freed to swing to a position corresponding to the weight of the skip and its contents, the fork 36 shifting the ball 39 to a position in which it establishes between the rollers 40 and 41 a speed ratio corresponding to the deflection of the pendulum. The skip continues to travel along the weigh rail 1, the time taken being the time required for the pendulum to cease hunting and to come to rest in the appropriate deflected position. Just before the skip begins to leave the weigh rail 1 a further projection (not shown) on the skip actuates the limit switch (119) which energises momentarily via terminals 121 and 122 the said second solenoid 74b which rocks the lever 74 and moves detent arm 74a out of the path of the stop 73 thereby enabling the cam assembly to rotate. The rise 72 on cam disc 70 then rocks the lever 112 so that the rollers 111 (FIG. 8) acting on the collar 110 move the rod 108 so as to withdraw its tapered end 109 from the rollers 106 and 107, so that the blocks 99' and 100' close on the plate 98 and hold the pendulum in its deflected position. When the rod 108 has become fully retracted the lever 116 moves in front of the collar 115 and thereby locks the rod 108 in the fully retracted position with the spring 114 compressed.

Rotation of the cam assembly (in the direction of arrow A, FIG. 10) also causes the rise 69 on cam 66 to rock the lever 86 so as to compress the spring 91 and cause the knife edge finger 96 to bear against the periphery of the cam disc 70, and as the cam assembly continues to rotate the knife edge finger 96 drops into the notch 71, under the action of spring 91, so that the member 95 rocks in anti-clockwise direction (FIG. 10) and the shaft 77 on which it is fixed also rocks, whereby the arm 78' (FIG. 9) actuates the switch 79 so as to energise the electromagnet 56 and de-energise the electromagnet 59. The armature disc 54 thereby becomes clutched to the face of electromagnet 56, thereby connecting the shaft 50 to the shaft 55. The speed of this shaft is proportional to the gross weight of the skip, and the pointer 52 commences to be rotated at a corresponding speed. The pointer 52 is rotated for a definite time, corresponding to approximately 330° rotation of the cam assembly, and when the cam assembly has nearly rotated through this angle the rise 67 on cam part 68 engages roller 87 and rocks the lever 89 in clockwise direction, compressing the spring 92 and causing the knife edge finger 97 to bear on the periphery of the cam disc 70, and eventually to drop into the notch 71. This causes the member 95 and the shaft 77 to rock in clockwise direction so that the arm 78" (FIG. 9) actuates the switch 79, which causes the de-energisation of the electro-magnet 56 and energisation of magnet 59 (FIGURE 12), so that the shaft 50 is disconnected from the shaft 55 and is braked by the attraction of the armature disc 55 to the face of fixed electromagnet 59. The pointer 52 is thereby arrested in the position reached by it at the end of the time elapsing between the dropping of the knife edge finger 96 into the notch 71 and the dropping of the knife edge finger 97 into this notch. Shortly afterwards the stop 73 engages the lever 74a thereby arresting the cam assembly.

I claim:

1. Weighing apparatus for weighing loads moved successively into a weighing position along a given path, said apparatus comprising a movable member controlled by a load to be weighed and being movable to a position determined by the weight of the load, retaining means for retaining said movable member in the position determined by the weight of the load, a rotary drive shaft, variable speed drive means arranged to drive said rotary drive shaft and controlled by said movable member for rotating said rotary drive shaft at a speed proportional to the weight of said load, an indicator having a movable indicator element and driving means including a shaft for driving said indicator element along a given path from a zero position, coupling means for coupling said indicator shaft with said rotary drive shaft, a controller operating through a cycle of fixed duration upon each initiation thereof, means operated by said controller to actuate said retaining means for retaining said movable member, means subsequently operated by said controller to actuate said coupling means to drive said indicator element for a fixed time interval during each operating cycle of the controller, and means operated by a load moving into the weighing position along said path to initiate the operating cycle of said controller.

2. Weighing apparatus according to claim 1, including means actuated by a load moving into the weighing position for releasing said retaining means to release said movable member, whereby the movable member will be retained by said retaining means from the time when said retaining means are actuated until said releasing means are actuated.

3. Weighing apparatus according to claim 1, including means operable by said controller at the end of said fixed time interval for arresting said indicator element in the position reached at the end of said interval, said means being released by said controller at the start of the next fixed time interval.

4. A weighing apparatus as claimed in claim 1, wherein said coupling means for coupling said indicator shaft with said rotary drive shaft comprises an electromagnetically operated clutch, and said arresting means for arresting said indicator element comprises an electromagnetically operated brake, said clutch and brake being arranged in one assembly and being alternatively operable.

5. A weighing apparatus as claimed in claim 1, wherein said controller includes a rotatable cam assembly connected to a constantly rotating driving means through a slippable clutch, the apparatus including detent means for arresting said cam assembly and means for tripping said detent means in response to the arrival of a load in the weighing position to enable the cam assembly to be driven through said slippable clutch.

6. Weighing apparatus comprising a movable member controlled by a load to be weighed and being movable from an initial position to a second position determined by the weight of the load, a rotary drive shaft, variable speed driving means controlled by said movable member for rotating said drive shaft at a constant speed proportional to the weight of said load, an indicator having a movable indicator element and driving means including a shaft for driving said indicator element along a given path from a zero position, coupling means for coupling said indicator shaft with said variable speed drive shaft, a controller operating through a cycle of fixed duration upon each initiation thereof, means operated by said controller to actuate said coupling means to drive said indicator element for a fixed time interval during each operating cycle of the controller and means to hold said indicator element in the position attained by it at the end of said fixed time interval.

7. Weighing apparatus according to claim 6 wherein said movable member comprises a pendulum which is deflected from an initial position under the weight of the load, and including clamping means controlled by said controller for clamping said pendulum in deflected position during said fixed time interval.

8. Weighing apparatus according to claim 7 wherein said clamping means is effective normally to clamp said pendulum in the deflected position of the previous weighing operation, means controlled by movement of a new load into weighing position to release said clamping means, and means thereafter starting operation of said controller.

References Cited in the file of this patent

UNITED STATES PATENTS

| | | |
|---|---|---|
| 761,438 | Barr | May 31, 1904 |
| 1,360,186 | Crane | Nov. 23, 1920 |
| 1,490,270 | Hebden | Apr. 15, 1924 |
| 1,757,072 | Boyer | May 6, 1930 |
| 2,193,648 | Schantz | Mar. 12, 1940 |
| 2,803,448 | Biebel | Aug. 20, 1957 |